United States Patent [19]

Fabian

[11] Patent Number: 5,123,040
[45] Date of Patent: Jun. 16, 1992

[54] MARKED X RAY FILM WITH MODIFIED CASSETTE FOR IDENTIFYING THE EXPOSURE SIDE OF A MEDICAL RADIOGRAPH

[76] Inventor: Carl E. Fabian, 577 NE. 96th St., Miami Shores, Fla. 33138

[21] Appl. No.: 572,852

[22] Filed: Aug. 27, 1990

[51] Int. Cl.⁵ .............................. G03B 42/04
[52] U.S. Cl. .......................... 378/182; 378/165; 378/166; 378/162
[58] Field of Search ........... 378/165, 166, 182, 187, 378/188, 184, 162

[56] References Cited

U.S. PATENT DOCUMENTS

| | | |
|---|---|---|
| 2,103,961 | Wilmanns | 378/188 |
| 3,846,635 | Shaffer | 378/186 |
| 4,331,236 | Bauer | 378/165 |
| 4,739,480 | Oono et al. | 378/166 |
| 4,764,948 | Hurwitz | 378/165 |
| 4,860,330 | Strömmer et al. | 378/166 |
| 4,953,193 | Robinson | 378/165 |

Primary Examiner—Edward P. Westin
Assistant Examiner—Kim-Kwok Chu

[57] ABSTRACT

A radiographic film cassette exposes a sheet of film to X-rays projected along an X-ray path by an X-ray tube. The cassette has an inner surface defining a recess for receiving the film sheet. A base having an inner surface is adapted to close upon the cover for securing the film sheet. A key is permanently mounted to the cover and disposed within the recess to provide the recess with chiral asymmetry. The sheet of film has a cutout adapted to engage the key. A marker is permanently fixed along at least one edge of the film. The key is so mounted that its disposition within the recess permits engagement with the cutout in only one orientation of the film sheet therein. The marker has chiral asymmetry and cooperates with the key and the cutout to identify the side of the film sheet facing the X-ray tube during exposure.

10 Claims, 7 Drawing Sheets

MARKED X RAY FILM WITH MODIFIED CASSETTE FOR IDENTIFYING THE EXPOSURE SIDE OF A MEDICAL RADIOGRAPH

BACKGROUND OF THE INVENTION

1. Field of the Invention

The present invention relates to the field of medical radiography; and more particularly to means for positively identifying the exposure side or front side of an X ray film.

2. Description of the Prior Art

A medical radiograph is the X ray image of some part of the body produced by an X ray beam originating from an X ray tube. The X ray beam passes first through the body and then through an X ray film cassette which is a light-proof, flat box of rigid construction. It is typically comprised of a base with a central recess to receive the film, and a cover joined to the base by hinges and containing latches permitting it to be opened and securely closed when a film is loaded. In order to diminish the X ray dose required to obtain a proper exposure of the film the inside surfaces of the cassette are lined with "intensifying screens" which sandwich the film between them. The X ray beam passing through the intensifying screens causes them to fluoresce and give off visible light which, in turn, exposes the film from both sides. Since the X ray film is much more sensitive to the visible light than to the X ray beam, most of the film exposure actually results from the induced light. The presence of the screens therefore allows the optimal film exposure to be achieved at significantly lower radiation doses than would otherwise be needed. Once the film is exposed, it is brought to the dark room, removed from the cassette and developed, causing the latent image to become visible. The radiograph is then ready for viewing and interpretation.

Since the film must be identified with pertinent information such as patient's name, date, etc., the cassette is also provided with what is herein called a "blocker". This blocker is generally comprised of two opposing strips of lead mounted on the inside surfaces of the cassette which shield the area of film between them from becoming exposed by either the X ray beam or its induced light. When the technologist is ready to develop the film a card bearing the appropriate patient data is placed into a device which light flashes the card, thereby projecting the data onto the unexposed area produced by the blocker. The position of the blocking rectangle within the cassette is not constant and may vary with the manufacturer, individual X ray department, and even from one cassette type to another within the same department.

Apparatus and methods, including modifications of the film cassette for marking exposed X ray film or radiographs with patient data are disclosed, for example by U.S. Pat. Nos. 3,628,864, 3,703,272, 4,465,364, 4,510,392, 4,806,959, 4,383,329, 4,520,497, and 4,768,114.

When rendering a diagnosis from a radiograph it is necessary for the film reader to know which side of the body is being viewed. Since the body is generally symmetrical, right-sided structures are similar in appearance to left-sided structures except that they are mirror-images or reversals of one another. For example, an X ray image of a left foot if viewed from the back of the exposed film will look like a right foot. Since radiographs are typically transparent and can be viewed from either side, it is possible for X ray images of one side of the body to become confused with the other. For this reason, when a medical radiograph is performed of some part of the body, it is customary for the technologist to affix an X ray opaque "R" or "L" marker on the cassette cover adjacent to the part being X-rayed to indicate which side of the body is represented on the film. Not infrequently however, the technologist places the wrong marker on the cassette or for one reason or another the marker is not visible on the film, being either obscured or omitted, so that the technologist is required to mark the film after it is developed, using an adhesive label, wax pencil, ink, or even scratch marks. The incidence of incorrect or absent right/left marking due to human error is quite substantial, reportedly as high as 30%. If a film is improperly marked and the physician interpreting the film recognizes the error he will often try to locate the technologist who performed the study to obtain clarification. When the question cannot be resolved in this manner, the patient may be recalled for a repeat examination which involves time, inconvenience, expense and additional radiation exposure. Furthermore, if the error should go undetected, inappropriate medical treatment may be the result.

Since the primary cause of this right/left confusion stems from the fact that the film is transparent and may be viewed from the front (exposure side) or the back, identifying the front side of the film for the viewer will prevent the inadvertent viewing of the film from the wrong side and thereby permit ready determination of which side of the body is represented thereon.

There is no means described in the prior art for permanently modifying the film cassette to expressly indicate the exposure side of the film.

SUMMARY OF THE INVENTION

The present invention provides an X ray film cassette with a permanent marking means for identifying the front side of the radiographic film. Such identification does not require a separate action by the X ray technologist, thereby substantially eliminating the element of human error.

Generally stated, the invention provides a radiographic film cassette for exposing a sheet of film to X rays projected along an X ray path by an X ray tube, comprising: a cover having an inner surface defining a recess for receiving a film sheet; a base having an inner surface adapted to close upon the cover for securing the film sheet; a key, permanently mounted to the cover and disposed within the recess to provide the recess with chiral asymmetry; and a sheet of film having a cutout adapted to engage the key, and a marker permanently fixed along at least one edge the film, the key being so mounted that its disposition within the recess permits engagement with the cutout in only one orientation of the film sheet therein, and the marker having chiral asymmetry and operating with the key and the cutout to identify the side of the film sheet facing the X ray tube during exposure.

In another embodiment, the invention provides a radiographic film cassette comprising: a sheet of film having front and back faces; a cover having an inner surface defining a recess for receiving the film sheet; a base having an inner surface adapted to close upon the cover for securing the film sheet; first means permanently mounted to the inside of the base and comprising a plurality of punches protruding into the cassette and arranged in a pattern having chiral asymmetry; and a second means permanently mounted to the cover and comprising a plurality of holes adapted to receive the punches, the first and second means being operative upon closing of the cassette, to create in the film a punch-out having chiral asymmetry that identifies the front of the film.

In use, the invention provides a means for positive identification of the front of the film sheet. The means is user friendly and virtually eliminates the element of human error. Positive identification of the front of the film permits more accurate diagnosis and results in fewer repeat examinations, thereby reducing the attendant inconvenience, expense and total radiation exposure to the population at large and improving the quality of medical care. Additionally, the means is copied to reproductions of the film sheet.

BRIEF DESCRIPTION OF THE DRAWINGS

The invention will be more fully understood and further advantages will become apparent when reference is made to the following detailed description of the preferred embodiment of the invention and the accompanying drawings, in which.

DESCRIPTION OF THE PREFERRED EMBODIMENTS

Figure 1:
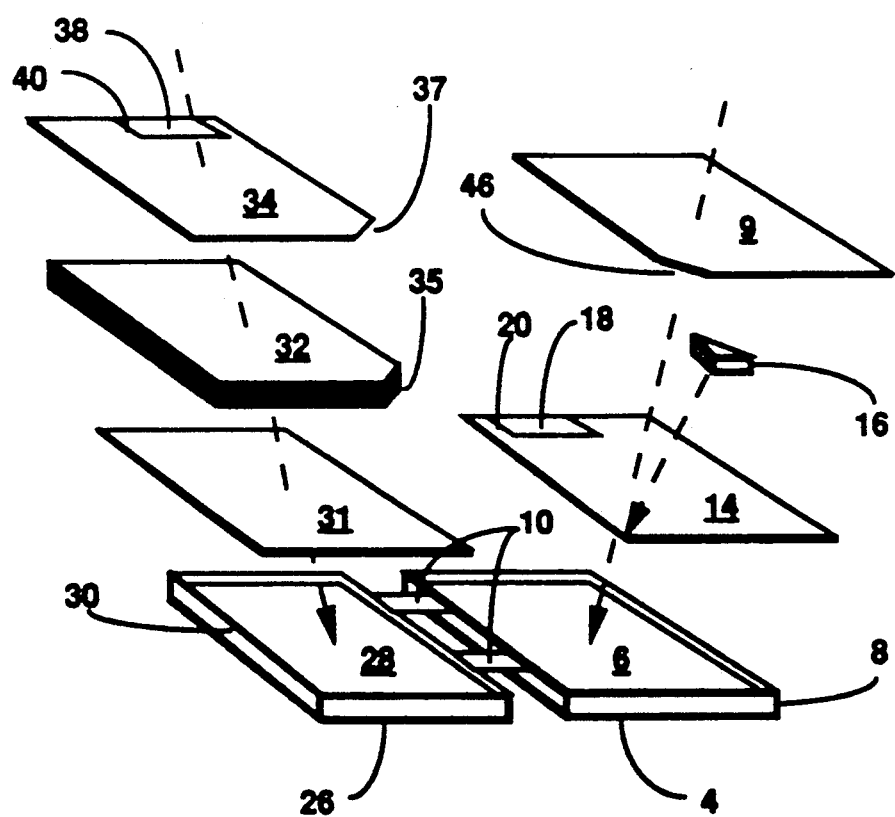
FIG. 1 is an exploded view of an X ray film cassette.
Figure 2:
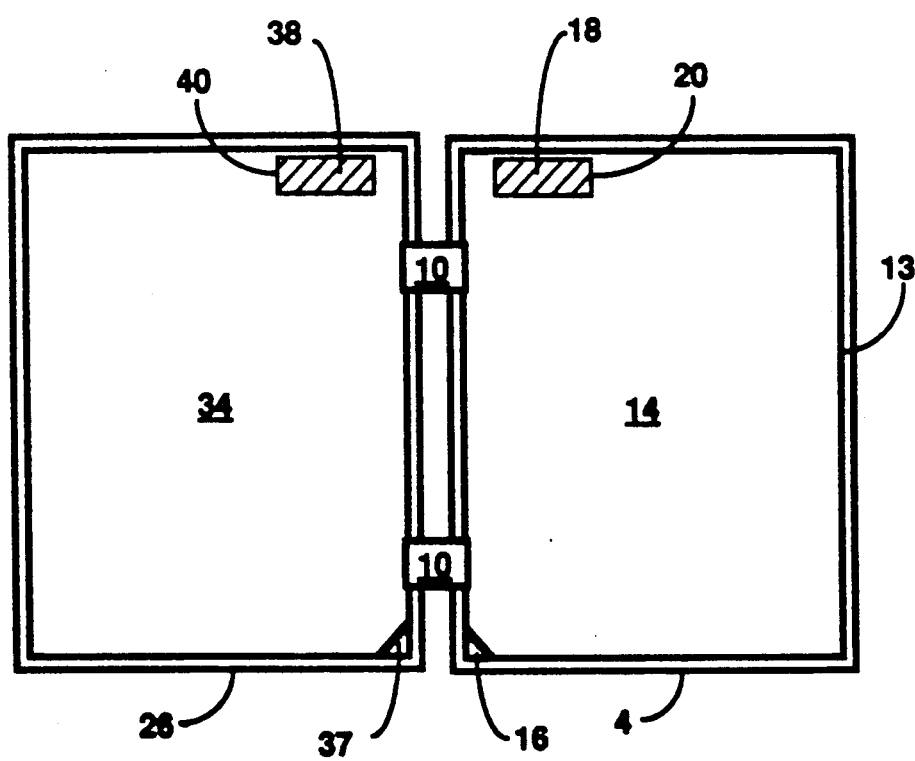
FIG. 2 illustrates an open cassette fitted with film loading key.

Referring to FIGS. 1 and 2 of the drawings, there is shown an X ray film cassette 2 having molded cover 4 of aluminum, plastic, or other suitable material which is transparent to X rays and which is of rigid construction. Cover 4 has a flat inner surface 6 and upstanding flanges 8 encompassing the periphery of surface 6. One or more hinges 10 are mounted along one of the flanges for attaching a base 26. A first intensifying screen 14 comprising a fluorescent material is attached to the inner surface 6. The first intensifying screen 14 is provided with a film orientation key 16 in a corner or along one edge. Together flange 8 and key 16 provide a chirally asymmetric recess 13 for receiving a sheet of film 9. Alternatively, key 16 is not fixed to screen 14 but is an extension of the flange 8. A blocker 18 comprised of lead or similar X ray opaque material fits within cutout 20 in intensifying screen 14, cutout 20 being provided to receive blocker 18. Typically, blocker 18 is approximately 1 inch by 3 inches. X rays entering cassette 2 through cover 4 are blocked from exposing the section of film under blocker 18. The film under blocker 18 can later be exposed with patient data by the X ray technologist.

Again referring to FIGS. 1 and 2, a molded base 26 is formed of aluminum, plastic or other suitable material which is transparent to X rays and which is of rigid construction. Base 26 has a flat inner surface 28 and upstanding flange 30 encompassing the periphery of surface 28 for receiving cover 4. Flange 30 is connected along one side to hinges 10. A foam pad 32 attached to the inner surface 28 of base 26 carries a second intensifying screen 34. Foam pad 32 and second intensifying screen 34 are each provided with a cutouts 35 and 37, respectively, for receiving the key 16. Preferably, key 16 extends above the surface of screen 14 far enough to protrude into the cutouts 35 and 37. A sheet of lead 31 may be interposed between pad 32 and inner surface 28. Blocker 38 and cutout 40 are identical to their respective counterparts 18 and 20 in cover 4 and are arranged so that the blockers 18 and 38 are stacked one over the other when cassette 2 is closed. X-rays entering cassette 2 through base 26 are blocked from exposing the section of film under blocker 38. The film under blocker 38 can later be exposed with patient data by the X ray technologist.

Alternatively, key 16 is mounted to base 26 protruding through cutouts 35 and 37.

Figure 3A:
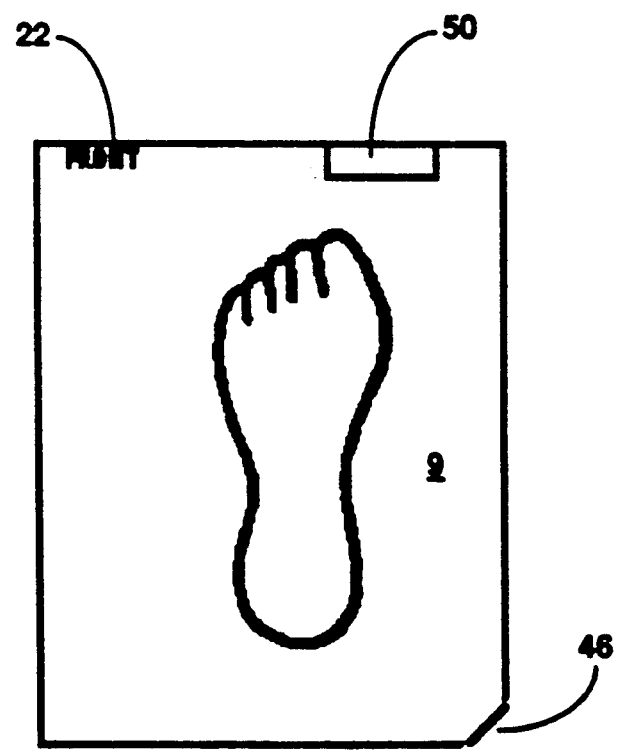
FIGS. 3a and 3b are views from the exposure side and back side, respectively, of a sheet of X ray film provided with a key cutout.
Figure 3B:
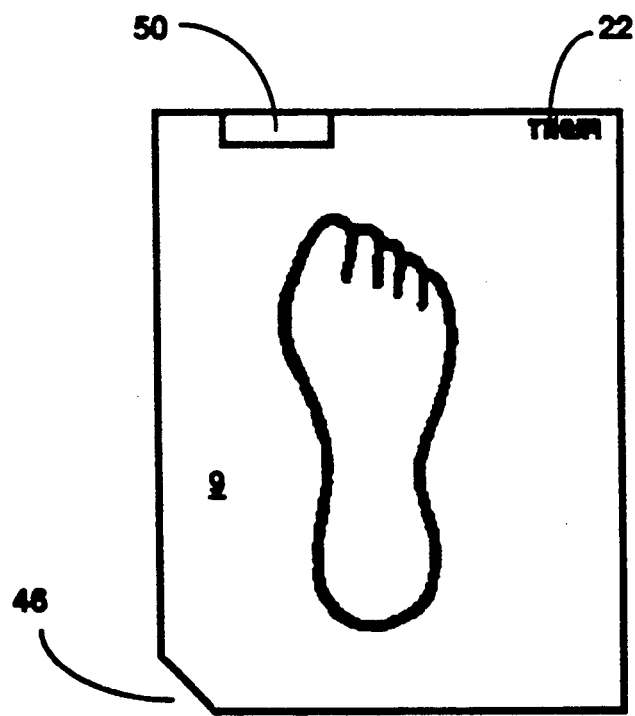

Film 9, as shown in FIG. 1 and FIGS. 3a and 3b, is provided with a cutout 46. Cutout 46, having the same shape as key 16 of cover 4, is sized and positioned in a corner or along the edge of the film, such that the film can only be inserted in one orientation within the recess 13 formed by the flange 8 and key 16 of cover 4.

Further, film 9 is provided with a marker 22 along one or more edges of the film. Marker 22 comprises ink, paint, or printed label, symbol, or lettering that is chirally asymmetric, meaning the mirror image of marker 22 is different from marker 22. The label, symbol, or lettering expressly indicates the front or exposure side of the film, such as "FRONT", or the letter "F", "EXPOSURE SIDE", "VIEWING SIDE", etc. Alternatively, marker 22 comprises a mechanically embossed or punch-out symbol or lettering, or marker 22 comprises chemical or heat printed symbol or lettering in emulsion or base of the film 9, such that the symbol or lettering is visible on developed film 9.

FIG. 3a illustrates an exposure-side view of a developed radiograph of a left foot taken with the X ray tube on the cover side of cassette 2. Image 50 is formed by blockers 18 and 38. FIG. 3b illustrates a back-side view of a developed radiograph of a left foot taken with the X ray tube on the cover side of cassette 2, the orientation of the anatomy is reversed making it appear like a right foot, but the marker image 22 is also reversed warning that the view is from the back side of film 9.

Figure 4:
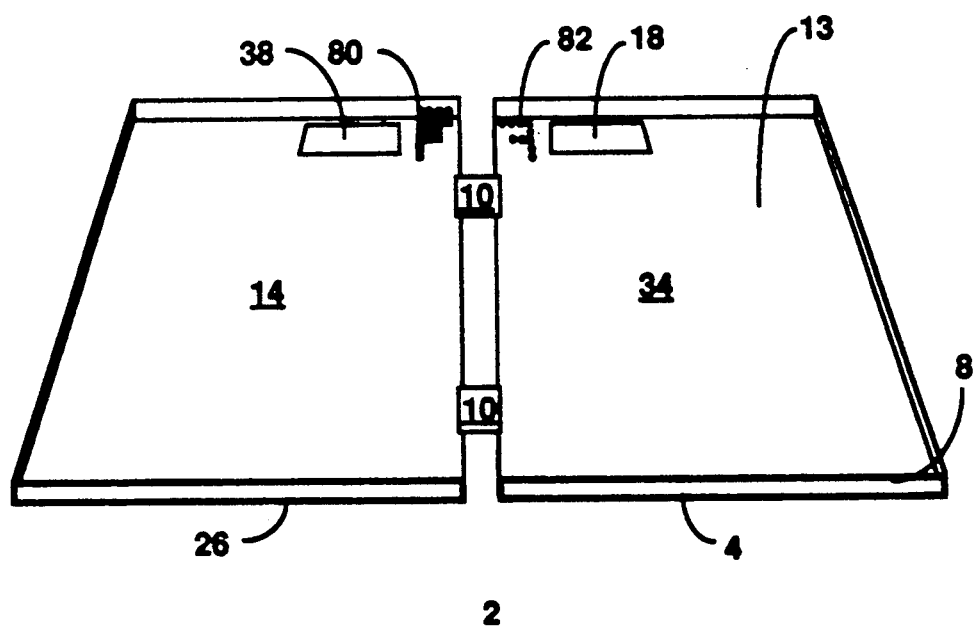
FIG. 4 is a perspective view of an open cassette provided with punches and matching holes.

In another embodiment of the invention, as shown in FIG. 4, cassette 2 and film 9 are as described in the previous embodiment but are not provided with cassette key 16, marker 22, film cutout 46, or cutouts 35 and 37. Instead, cassette 2 is provided with a means for mechanically marking film 9 with a marker to establish the orientation of the film in the cassette during X ray exposure.

Figure 5A:
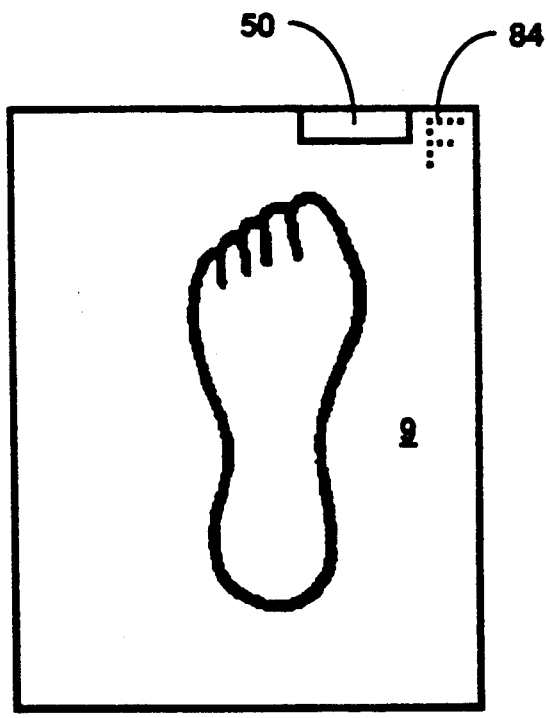
FIGS. 5a and 5b are views from the exposure side and back side, respectively, of a sheet of X ray film provided with a punch-out.
Figure 5B:
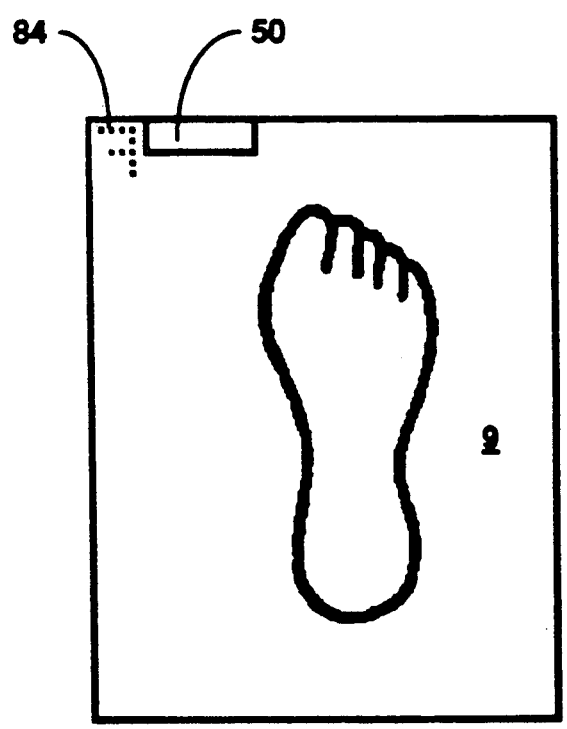

Base 26 of cassette 2 is provided with a plurality of punches 80. Punches 80 protrude from the inside of base 26 into cassette 2 and are arranged to form a chirally asymmetric symbol or lettering such as "F" or "FRONT". Cover 4 is provided with a series of holes 82 extending into cover 4. Holes 82 are sized and positioned within cover 4 of the cassette 2 to receive the punches 80. Upon closing cassette 2, punches 80 mounted in the base 26 punch a series of punch-outs 84 into film 9, as shown in FIGS. 5a and 5b, the punch-outs 84 therefore indicate the front of the film 9.

The invention has been described in detail with particular reference to the preferred embodiments thereof, but it will be understood that additional variations and modifications may suggest themselves to one skilled in the art, all falling within the scope of the invention as defined by the subjoined claims.

What is claimed is:

1. A radiographic film cassette for exposing a sheet of film to X rays projected along an X ray path by an X ray tube, comprising:
   (a) a cover having an inner surface defining a recess for receiving said film sheet;
   (b) a base having an inner surface adapted to close upon said cover for securing said film sheet;
   (c) a key, permanently mounted to said cover and disposed within said recess to provide said recess with chiral asymmetry; and
   (d) a sheet of film having a cutout adapted to engage said key and a marker permanently fixed along at least one edge thereof, said key being so mounted that its disposition within said recess permits engagement with said cutout in only one orientation of said film sheet therein, and said marker having chiral asymmetry and operating with said key and said cutout to identify the side of said film sheet facing said X ray tube during exposure.

2. A film sheet as recited in claim 1, wherein said marker comprises a printed label, symbol or lettering that expressly indicates the front side of said film.

3. A film sheet as recited in claim 1, wherein said marker comprises a mechanically embossed label, symbol or lettering that expressly indicates the front of said film.

4. A film sheet as recited in claim 1, wherein said marker comprises a mechanical cutout of a symbol or lettering that expressly indicates the front of said film.

5. A film cassette as recited in claim 1, wherein said key is permanently mounted along the edge of said recess.

6. A film cassette as recited in claim 1, wherein said key is permanently mounted in the corner of said recess.

7. A film cassette as recited in claim 1, wherein said key is permanently mounted along an inside edge of said base.

8. A film cassette as recited in claim 1, wherein said key is permanently mounted in the corner of said base.

9. A radiographic film cassette for exposing a sheet of film to X rays projected along an X ray path by an X ray tube, comprising:
   (a) a sheet of film having front and back faces;
   (b) a cover having an inner surface defining a recess for receiving said film sheet;
   (c) a base having an inner surface adapted to close upon said cover for securing said film sheet; and
   (d) means for mechanically marking said film upon closing of said cassette, said marking having chiral asymmetry and being operative to identify the front face of said film.

10. A radiographic film cassette for exposing a sheet of film to X rays projected along an X ray path by an X ray tube, comprising:
   (a) a sheet of film having front and back faces;
   (b) a cover having an inner surface defining a recess for receiving said film sheet;
   (c) a base having an inner surface adapted to close upon said cover for securing said film sheet;
   (d) first means permanently mounted to the inside of said base, and comprising a plurality of punches protruding into said cassette and arranged in a pattern having chiral asymmetry; and
   (e) second means permanently mounted to said cover, and comprising a plurality of holes adapted to receive said punches; said first and second means being operative upon closing of said cassette, to create in said film a punch-out having chiral asymmetry that identifies the front of said film.

* * * * *